Patented July 16, 1940

2,208,505

UNITED STATES PATENT OFFICE 2,208,505

PROCESS FOR SWEETENING HYDROCARBON OILS

Charles M. Blair, Jr., Webster Groves, Mo., and Ira S. Boydstun, Fort Worth, Tex., assignors to Petrolite Corporation, Ltd., Wilmington, Del., a corporation of Delaware No Drawing. Application October 28, 1939, Serial No. 301,828

14 Claims. (Cl. 196—33)

Our invention relates to the sweetening of hydrocarbon oils and more particularly has reference to improvements in the conventional doctor treatment for the removal of mercaptans from light hydrocarbon distillates such as gasoline, naphtha, kerosene, benzine and petroleum oils in general.

It is a principal object of the invention to render the doctor treatment more rapid and economical and to produce sweetened distillates of unusually desirable properties.

The doctor treatment has long been applied to petroleum oils for the removal of mercaptans. It involves treatment of the oil with elementary sulfur and an aqueous alkaline solution of sodium plumbite, known as the "doctor solution." The plumbite solution effects a chemical reaction between the mercaptans and the elementary sulfur, resulting in the conversion of the mercaptans to dialkyl disulfides and also into some trisulfides, while the sulfur is converted mainly into sulfides, polysulfides, thiosulfates, etc.

In practicing the conventional doctor treatment, an excess of elementary sulfur is used to bring about a "break," a term used in the art to indicate the settling or subsidence point in the doctor treatment. That is to say, the amount of free sulfur used is in excess of the theoretical quantity required to convert the mercaptans into disulfides and other innocuous compounds, the excess serving to induce the "break" in the treatment. Such use of elementary sulfur to effect settling or subsidence results in the incorporation of sulfur into the distillate, with its attendant objections. Among these objections, in the case of gasoline, are poor inhibitor and tetraethyl lead susceptibility, lowered anti-knock value, increased corrosive action on metals, poor color and odor stability, and increased tendency to form gum.

Although doctor treatment in its many variations is well understood in the art, it may be well to emphasize, by a suitable reference, the circumstances and conditions attending a break and the difficulty of coagulating the colloidal black precipitate.

"Doctor plants differ in the way in which doctor solution and sulfur are mixed with the gasoline and the length of time they remain in contact. It is common practice to add the sulfur in gasoline solution before, at the same time as, or after the gasoline and doctor solutions are mixed. The mixing may be done by orifice plates, baffled pipes, pipes with right-angle bends, or mechanical mixing devices, and mixing time may vary from a few seconds to several minutes.

"When sulfur is added to a mixture of gasoline and doctor solution, the oil becomes orange-red in color; after a longer or shorter time, depending on the gasoline and the amount of sulfur added, the 'break' takes place, when the color disappears and a red-brown to black precipitate, usually called lead sulfide, forms and settles.

"In different plants, the break may be produced as the gasoline leaves the mixers or it may not occur until after the gasoline has entered the settling drum. If a plant has adequate mixing (the proper time of mixing will depend on the type of gasoline and somewhat on the degree or sourness), the gasoline may be allowed to break as it leaves the mixers, and the amount of sulfur required to do this will not be so great as the harm inhibitor susceptibility. However, if a plant has little mixing equipment (a common installation is three mixing nozzles in about six feet of line, which for most gasoline is much less mixing than is desirable), a break cannot be obtained in the mixers without using a considerable excess of sulfur, with consequent detriment to the inhibitor effectiveness. If, however, the break in such plants occurs in the first settler from 3 to 15 minutes after the gasoline leaves the mixers, the results from an inhibitor standpoint will usually be satisfactory. But when the break occurs in the settler, the gasoline being no longer in contact with doctor solution, it tends to produce a finer precipitate, settling more slowly than when the gasoline is broken out while still in contact with doctor solution. As plants deficient in mixing equipment are also often lacking in settling capacity, the treater in such cases faces a serious dilemma. If he uses excess sulfur, his gasoline settles well but inhibitor susceptibility is poor; if sulfur is kept down, the gasoline breaks and settles slowly and lead sulfide leaves the plant suspended in the gasoline." (Industrial & Engineering Chemistry, vol. 30, No. 11, Nov. 1938, p. 1276).

Thus, in actual practice, the present trend has been to continue to use sulfur as a break inducer, insofar that no universal and economic solution of the problem has been heretofore available. Some effort has been made to solve the problem by subsequent washing with aqueous solution, but this has resulted in attendant loss of expensive lead. Another approach to the problem concerned the use of sodium oleate, sodium resinate, sodium stearate, sodium palmitate, and other simple unmodified fatty materials as break inducers for replacing a part of the sulfur which is ordinarily used as a break inducer. It is not believed that such procedure is ordinarily applicable as a complete substitute for sulfur as a break inducer. Or, in other words, it is not believed that any attempt has been made to apply such process in instances where the amount of elementary sulfur represented only theoretical quantities and which would necessitate that the simple fatty materials, such as soap, be relied upon solely as the break inducer.

We have now found that certain complex organic compounds possess the property of inducing a break in the doctor treatment and our invention involves their use, in the sweetening of sour oils by means of plumbite solution and elementary sulfur, to effect the settling or subsidence in the known sweetening process.

The complex organic compounds referred to, whose use to induce the break in the doctor treatment constitutes the principal feature of our invention, are water-soluble salts of sulfonic acids having a molecular weight range between 214–1000, containing hydrocarbon radicals or residues, and characterized by the fact that their alkali metal salts are surface-active. By "surface-active," it is intended to mean that a relatively dilute solution of such alkali metal salts, for instance, the sodium or potassium salt and also the ammonium salt, in a solution containing a few tenths of a percent. or thereabouts, will show a marked lowering of the static surface tension in comparison with distilled water. The types of compounds employed in the present process and methods for manufacturing them are known and per se form no part of our invention. However, for the sake of a better understanding of the invention, we will hereinafter refer to specific patents disclosing methods for producing compounds employed in our process.

More specifically, our invention includes the use, as break inducers in doctor sweetening, of the water-soluble salts of petroleum sulfonic acids, fatty sulfonic acids, fatty aromatic sulfonic acids, alkylated mono-carbocyclic sulfonic acids, alkylated non-hydrogenated dicarbocyclic sulfonic acids, partially or completely hydrogenated alkylated dicarbocyclic sulfonic acids, alkylated polycarbocyclic sulfonic acids containing at least three nuclei, cyclo-alkylated carbocyclic sulfonic acids free of alkyl radicals, and aralkylated carbocyclic sulfonic acids free of alkyl radicals.

The sulfonic acids derived from petroleum constitute an important group of acids whose water-soluble salts are contemplated for use as break inducers according to the present invention. One common variety of a petroleum sulfonic acid is the kind frequently referred to as green acid or green acids. Petroleum sulfonic acids are produced from a wide variety of petroleum distillates, petroleum fractions, and in some instances, from crude petroleum itself. When produced from crude petroleum itself, it is customary to use crude oil of the naphthene type, crude oil of the paraffin type, crude oil of the asphaltic type, or a mixture of the same. The art of refining crude petroleum or various petroleum fractions, using sulfuric acid of various strengths, as well as monohydrate and fuming acid, is a well-known procedure. In such conventional refining procedure, petroleum sulfonic acids have been produced as by-products. For instance, in removing the olefinic components, it has been common practice to use sulfuric acid so as to polymerize the olefins or convert them into sulfonic acids, which are subsequently removed. Likewise, in the production of white oil or highly refined lubricating oils, it has been customary to treat with fuming acid so as to eliminate certain undesirable components. In recent years certain mineral oil fractions have been treated with sulfuric acid with the primary object of producing petroleum sulfonic acids; and in such procedure the petroleum sulfonic acids represented the primary objects of reaction rather than concomitant byproducts. Petroleum sulfonic acids, regardless of whether derived as the principal product of reaction or as the byproduct, can be divided into two general types, to wit, green acid or acids, and mahogany acid or acids. The green acids are characterized by being water-soluble or dispersible. In other words, they form true solutions or sols. The green acids, as indicated by their name, frequently give an aqueous solution having a dark green or gray-green appearance. They generally appear as a component of the acid draw-off, and do not remain behind dissolved in the oil fraction which has been subjected to sulfuric acid treatment. The green acids are not soluble in oil even when substantially anhydrous, and are definitely not soluble in oil when they contain as much as 15% of water. Similarly, their salts obtained by neutralizing the green acids with strong solution of caustic soda, caustic potash, or ammonia, are not oil-soluble. The green acids are essentially hydrophilic and not hydrophobic in character. They are common articles of commerce and can be purchased as such from a number of available sources or can be purchased in the form of suitable salts or sodium salts.

In some instances a pre-treated or untreated petroleum crude or some fraction thereof is subjected to an extraction process which removes certain constituents. After the removal of such pre-determined constituents, the residual oil can be treated so as to yield a type of green acid. Illustrating this type of petroleum acid, reference is made to U. S. Patent 1,895,195, January 24, 1933, to Limburg.

On the other hand, suitable sulfonic acids and sulfonates are often prepared from the material extracted from a petroleum fraction or a crude petroleum. Petroleum fractions are frequently extracted with sulfur dioxide by what is commonly referred to as the Edeleanu process. After the removal of the sulfur dioxide, the extracted material or a suitable fraction thereof may be subjected to sulfonation to give a sulfonic acid whose water-soluble salts are satisfactory for the purposes herein contemplated. Illustrating such sulfonic acids, reference is made to U. S. Patent 1,836,429, December 15, 1931, to Baddiley et al., and to U. S. Patent 1,955,859, April 24, 1934, to Osburn et al.

It is also well known that in the sulfonation of the extracted material or fraction thereof of the kind just referred to, an alcohol such as isopropyl alcohol may be added so as to be present during the sulfonation process, with the result that a modified or slightly different water-soluble sulfonic acid is formed. Such condensed petroleum acids, which are essentially slightly modified petroleum acids, are entirely satisfactory for use as breaking inducing agents and may be employed for this purpose according to our invention. As examples of this type of petroleum sulfonic acids, reference is made to U. S. Patents 1,836,428, 1,836,429, 1,836,430 and 1,836,431, December 15, 1931, to Baddiley et al.

Not only is it possible to add alcohol during the sulfonation of an extracted portion or fraction thereof, but alcohol may also be added, for instance, isopropyl or isobutyl alcohol, during the sulfonation of any suitable petroleum body, as disclosed, for example, in U. S. Patent 1,766,063, June 24, 1930, to De Groote et al.

Other suitable petroleum sulfonic acids may be obtained by other well-known procedures. For instance, low molecular weight hydrocarbons may be polymerized; and the product so obtained may be sulfonated; or sulfonation and polymerization may take place simultaneously. See German Patent 550,242, May 19, 1932, to Chemische Fabrik Pott & Company.

Similarly, another type of suitable breaking inducing agent are the water-soluble salts of the petroleum sulfonic acid derived by first subjecting a suitable petroleum fraction or other hydrocarbon body derived from petroleum, to the action of an oxidizing agent, followed by sulfonation. As illustrating these particular types, reference is made to U. S. Patent 1,909,295, May 16, 1933, to Luthar et al. and to U. S. Patent 2,042,410, May 6, 1936, to Peirce.

Water-soluble salts of true sulfo-naphthenic acids, i. e., chemical compounds containing the naphthene nucleus, a sulfonic group, and a carboxy group, represent a suitable type of a break-inducing agent. Such compounds, of course, must be differentiated from sulfo-naphthenes, that is, the naphthene type of compound containing a sulfonic acid group but no carboxyl. See Brit. P. 275,267, February 4, 1929, to Chem Fab. Milch, A.-G.

The sulfonic acids derived from fatty acids or fatty materials whose water-soluble salts are contemplated in the present invention, are of the kind which have been frequently employed as fat splitters. Their composition and method of making the same are well understood, and they are available from the usual sources. For the manufacture of fatty sulfonic acids, reference is made to U. S. Patent 601,603, March 29, 1898, to Ernst Twitchell and to U. S. Patent 1,931,491, October 24, 1933, to Haussmann. It is also well known that sulfonic acids can be prepared readily from fatty acid sulfates by treating the sulfates in the form of sodium salts with sodium sulfite so as to eliminate sodium sulfate. Naturally, such procedure would be employed to give a variety of fatty sulfonic acids in such instances where it is easier to prepare a fatty acid sulfate and convert into the sodium salt.

Another type of a suitable fatty sulfonic acid is the type which is characterized by the fact that an aromatic radical is included and that the sulfonic group is directly attached to the aromatic nucleus instead of being directly attached to the hydrocarbon chain of the fatty acid. This type is commonly referred to as a Twitchell reagent. See U. S. Patent 628,503, July 11, 1899, to Ernst Twitchell.

Another class of breaking inducing agents is the type characterized by the water-soluble salts of the alkylated aromatic sulfonic acids. Although such acids may be derived from monocyclic aromatic compounds, such as cymene or the like, it is preferable that they be derived from polycyclic aromatic compounds, such as naphthalene, anthracene, diphenyl, etc. Generally speaking, it is usually preferable to use naphthalene for various reasons, but particularly due to its low cost. In regard to the uncondensed polycyclic compounds, it is generally desirable to use diphenyl or hydroxy diphenyl. Although reference has been made to compounds derived from naphthalene, it is obvious that similar compounds, i. e., alkylated sulfonic acids, can be derived from any other suitable polycyclic material, condensed or uncondensed, or may be derived from a monocyclic material. The production of alkylated naphthalene sulfonic acids is described in U. S. Patent 2,076,623, April 13, 1937, to De Groote et al. The acidic mass thus obtained may be used as such or may be neutralized with the hydroxide of sodium, potassium, or ammonium, or with some other suitable base, such as calcium oxide, magnesium oxide, triethanolamine, or any suitable material, either organic or inorganic in nature.

In some instances compounds of the kind described are manufactured most expediently from olefins or diolefins, as, for instance, the type illustrated in U. S. Patent 2,072,153, March 2, 1937, to Bruson et al. In some instances it is particularly desirable to introduce an alkyl radical having more than 10 carbon atoms and possibly as many as 30 carbon atoms. Such materials may be manufactured in the manner described in U. S. Patent 2,083,223, January 8, 1937, to De Groote or as described in U. S. Patent 2,161,173, June 6, 1939, to Kyrides.

For the manufacture of sulfonated alkylated diphenyl compounds, reference is made to U. S. Patent 1,901,507, March 14, 1933, to Guenther, and to U. S. Patent 2,135,978, November 8, 1938, to Magoun.

As to similar materials having an alicyclic nucleus and more particularly, an aromatic nucleus, reference is made to the aforementioned Guenther Patent 1,901,507. Similarly, mono-, di- or triamylated naphthalene, which is an article of commerce, may be hydrogenated and subjected to sulfonation. Another compound commercially available which is suitable for use is retene sulfonic acid or its sodium salt.

In the manufacture of compounds of the kind previously described, it is not necessary to employ alkyl alcohols; but if desired, alicyclic alcohols, such as cyclohexanol or an aralkyl alcohol, such as benzyl alcohol, may be employed, or the equivalent of cyclohexanol, to wit, a cyclic olefin may be employed. Obviously, if an aralkyl alcohol is employed, for instance, benzyl alcohol and benzene or naphthalene, one obtains in essence a diaryl methane; and it is intended to include the use of sulfonated diaryl methanes and their various homologues in the present invention. This type of material is also obtainable in other ways, for instance, condensation of two nuclei by introduction of the methylene bridge or substituted methylene bridge derived from formaldehyde or acetone or similar compounds. In this connection reference is made to U. S. Patent 1,336,759, April 13, 1920, to Schmidt, and to British Patent 467,998, December 28, 1935, to Carpmael.

In the preparation of the break inducing agents above described, it will be understood, of course, that the hydrocarbon or fatty materials employed may contain nonfunctional radicals or atoms such as halogens, hydroxyl groups, etc.

Generally, the sodium, potassium or ammonium salts of the sulfonic acids are preferred because of their cheapness. The acids themselves may be added to the oil undergoing sweetening, in which event the added sulfonic acid is immediately converted to a salt as a result of its contact with the alkaline doctor solution. Therefore, although the appended claims refer to the use of sulfonic acid salts, they embrace the addition of the corresponding acids because of the conversion of the latter to salts in the sweetening process. However, it is preferable to employ the pre-formed salts since the acids present a corrosion problem in transportation and handling. When a salt other than the sodium salt is added to the oil, for example, the ammonium salt, amylamine salt, triethanolamine salt, or the like, it is quite likely that in actual use it is converted to the sodium salt, due to the large amount of alkali present.

In view of the wide variety of materials herein disclosed as suitable breaking inducing agents, it is apparent that it is usually feasible and desirable to conduct a certain amount of routine experimentation in order to determine which breaking inducing agent is best adapted for use under specific plant conditions, and in view of market availability of various chemical compounds. Generally speaking, any of the break inducing agents indicated may be employed; but it is usually desirable to experiment with those which are cheapest; and if results so obtained are satisfactory, it should be unnecessary to conduct further tests. Sometimes, when several break inducing agents are available at substantially the same cost, it may be found that the choice resides with the particular hydrocarbon being treated or the particular plant design.

It is to be noted that in some instances the sulfonic acids are characterized by containing more than one sulfonic group; and in other instances they are characterized by having a carboxy radical, as well as a sulfonic acid radical. Although all the sulfonic acids and their alkali metal salts are water-soluble, it is to be emphasized that in some instances, by reaction with a suitable amine, such as cyclohexylamine, one may obtain an amine salt which is oil soluble. Such an amine salt may be particularly adapted for use where it is desirable to dissolve the break-inducing agent directly in the hydro carbon oil or to dissolve it in the form of an oily solution.

The compounds herein disclosed are preferably used as the sole break inducer for the doctor treatment, in which event the quantity of elementary sulfur employed in the doctor treatment is not in excess of the theoretical amount required to convert the mercaptans. In this preferred operation, where no appreciable excess of sulfur is used in the doctor treatment, there is effected a faster break than can be obtained by means of other break inducers and frequently a break is effected where one might not be otherwise obtainable. Additionally, there is recovered a distillate which is free of excess sulfur, an important advantage as has already been indicated.

However, the invention is not limited to the use of the organic compounds referred to as the sole break inducer but they may be employed in conjunction with other substances having a like property, such as elementary sulfur. In operation of this type, a small excess of sulfur would be used in the doctor treatment, the excess functioning with the compounds of this invention to bring about the desired break in the treatment. The advantages of such operation are that relatively little sulfur is required, the break is induced very rapidly, and frequently a break is effected where one cannot be obtained at all by means of sulfur alone.

As to the preferred operation above indicated, it will be observed that the doctor treatment differs from that heretofore employed in that the quantity of elementary sulfur added is only the theoretical amount based on stoichiometrical calculations, or other comparable test, to convert mercaptans to disulfides and other innocuous compounds, there being present during the treatment no excess of sulfur capable of completely or partially acting as a break inducer. Elementary sulfur, if present in sufficient excess in the sweetened distillate, can be detected by the doctor test with the addition of a mercaptan such as ethyl or butyl mercaptan. For instance, a sweetened gasoline containing an excess of elementary sulfur no longer shows positive in the doctor test. However, if there is a slight excess of elementary sulfur present, this elementary sulfur can be detected by the addition of butyl mercaptan or the like, followed by a doctor test on the admixture. A large excess may be indicated by the less sensitive copper strip test.

The butyl mercaptan test, referred to above, is commonly used in a qualitative manner to detect excess elementary sulfur. This test is described in the Universal Oil Products Co. Bulletin No. 22, p. 15, as follows:

"In doctor sweetening, the most important factor in securing inhibitor effectiveness, is to use the smallest possible amount of sulfur. Sulfur addition may be controlled by testing with mercury or butyl mercaptan. In making the butyl mercaptan test, a sample of gasoline drawn from the doctor plant after it has left the mixers is allowed to stand until the lead sulfide has settled, and 30 cc. filtered into a 4 ounce oil sample bottle. 20 cc. of a 1 to 1,400 solution of butyl mercaptan is added and 10 cc. of doctor solution. The mixture is shaken for 15 seconds and observed. The sample should be green-yellow. It will slowly become opaque but should remain yellow in color even if observed for 30 minutes. If it turns orange or brown, excess sulfur has been used, and on addition of inhibitor the gasoline will have lower induction period and higher copper dish gum than would have resulted had less sulfur been used."

The chemistry of the reactions which enter into doctor sweetening is rather complex and not completely understood. However, it is common practice, for the purpose of calculating the amount of sulfur necessary, to use the following reaction as being representative:

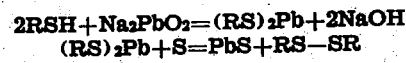

Wherein R represents the hydrocarbon group of a mercaptan or disulfide.

The amount of sulfur required for completion of these reactions may be calculated from the original mercaptan content of the distillate. With some distillates, the sweetening reaction appears to lead to the formation of stable trisulfides, rather than disulfides. In this case the reactions presumably proceed as follows:

$$2RSH + Na_2PbO_2 = (RS)_2Pb + 2NaOH$$
$$(RS)_2Pb + S = (RS)_2SPb$$
$$(RS)_2SPb + S = R\!-\!S\!-\!S\!-\!S\!-\!R + PbS$$

With distillates where these reactions take place, the theoretical sulfur requirement may be calculated by use of the above equations and the known original mercaptan content of the distillate. However, for all practical purposes, the butyl mercaptan test, previously described, may be used as a test for whether or not excess sulfur has been used. Accordingly, the term "negative to the butyl mercaptan test," as applied to sweetened distillates, is used herein to mean that a distillate has been sweetened with the theoretical amount of sulfur, or that the minimum amount of sulfur necessary for completion of the sweetening reaction has been employed. The reason for this is that the butyl mercaptan test may be made more easily and more quickly than a determination of the actual course or nature of the sweetening reactions.

As is understood, of course, if hydrogen sulfide is present, allowance must be made for the amount of lead required to remove such sulfide. However, this is not apt to be a factor requiring consideration, due to usual preliminary removal of hydrogen sulfide.

In view of what has been said previously, it is obvious that the satisfactory application of the doctor treatment must involve a rapid and complete separation of lead sulfide and associated insoluble material, as soon as the mercaptans are converted into disulfides or other more innocuous compounds. Although the above reactions indicate only the precipitation of lead sulfide, it has been found that in reality a precipitate may contain a comparatively small amount of lead sulfide; and there may also be present various complex materials, part of which at least are organic in nature and may represent basic mercaptides. The equations indicate that the amount of elementary sulfur to be added per pound of combined sulfur present as mercaptan should be in the ratio of one-half to one. In actual practice, however, with the conventional doctor treatment, the quantity of sulfur added for complete reaction, and particularly to give subsidence or settling of the black precipitate, is not so definite. As a matter of common practice, sulfur is added in the conventional doctor treatment for two distinct purposes of converting mercaptans and inducing the break; and these two purposes must be fully appreciated in order to understand the benefit obtained by applying the improved procedure which constitutes our present invention, particularly in its preferable form, i. e., where the complex organic compounds herein described are used as the sole break inducer, with only the theoretical amount of sulfur to convert mercaptans or to give a negative butyl mercaptan test.

It has heretofore been proposed to employ water soluble soaps to effect the break in doctor treatment, the soaps being utilized in ratios of 1 to 2500 or 1 to 7500. At such ratios, the common soaps are often ineffective and hence there is the tendency to employ just as much sulfur as if no soap had been added. In contradistinction to the common soaps heretofore contemplated, the break inducers of the present invention are invariably effective and invariably enable a marked reduction in the amount of sulfur needed in the doctor treatment, even to the extent, as in the preferred embodiment already described, of limiting the sulfur to the theoretical amount necessary for converting the mercaptans into innocuous compounds.

The break inducers of this invention need be used in only very minute quantities, for example, in ratios varying from 1 to 5000 or 1 to 7500 or even 1 to 75,000, based on recovered or sweetened gasoline or other distillate treated. To the extent that our improved break inducers possess the property of forming oil-in-water emulsions, it should be observed that they are employed in such insignificant quantities that they do not exhibit any detectable or appreciable emulsifying action.

Although our invention can be applied to any variation of the conventional doctor treatment in a manner which is most convenient under the specific conditions surrounding the particular operation, for purposes of brevity, we will describe only the preferable form of procedure, i. e., where the herein disclosed organic compounds are used as sole break inducers. It is obvious, however, that those skilled in the art and acquainted with such procedure could readily modify the conventional doctor treatment in which elementary sulfur is used as a break inducer, so as to reduce the amount of sulfur employed, and offset that reduction by suitable quantities of the break inducers of this invention.

In a continuous doctor sweetening plant, the organic break inducer is added continuously to the stream of sour distillate prior to its admixture with doctor solution and sulfur. When the break inducer is a liquid, this is conveniently done by means of a small injector pump adjusted to deliver the break inducer in some definite, desired amount, usually within the limits of one part per 7500 to 75,000 parts of gasoline. After the introduction of break inducer has begun, the amount of sulfur added to the distillate, or to the mixture of distillate and doctor solution, is decreased to the theoretical amount.

In batch system doctor sweetening plants, the required amount of break inducer is introduced into the sour distillate and mixed thoroughly before the treatment with doctor solution and sulfur. In this case, also, the amount of sulfur used is reduced to the theoretical amount.

Sometimes better results are obtained if the break inducer is added to the doctor solution or to the distillate after the latter has been mixed with doctor solution and sulfur. Regardless of the point of introduction of the break inducer, however, the amount of sulfur required for completion of the sweetening reactions and subsidence of the black precipitate is reduced to, or nearly to, the theoretical amount.

The doctor solution used for sweetening is generally regenerated after each use and employed for sweetening further amounts of sour distillate. Where the break inducer has been added to the doctor solution, its activity may persist thru one or more regenerations, but eventually further amounts will have to be added. The number of volumes of distillate sweetened per volume of break inducer used in the doctor solution usually will be more than 7500, and the ratio of break inducer may average one part to 25,000 parts sweetened distillate.

In order to illustrate the effectiveness of the complex organic materials employed as break inducers, the following table is included. This table includes the results obtained on the gasoline produced from Louisiana and Arkansas crudes and is typical of a number of similar tests obtained on the wide varieties of gasoline derived from other sources and produced in various refineries, and is also typical of actual plant operations. Figures refer to tests made with 100 gm. portions of gasoline.

In comparison to the results above indicated, attention is directed to the results obtained when employing the complex break inducers herein contemplated for use in the doctor treatment.

It is to be noted that in each instance the addition of the organic break inducer was in a ratio of 1 to 20,000 and an excellent break was obtained even when there was no sulfur available for

| Mg. of sulfur required (theory) | Actual Mg. of sulfur used | Break inducer used | Ratio of break inducer used to distillate treated | Character of break | Doctor test on distillate | Butyl mercaptan test on distillate |
|---|---|---|---|---|---|---|
| 6.0 | 6.0 | None | 0 | None obtained | | |
| 6.0 | 7.0 | ----do---- | 0 | ----do---- | | |
| 6.0 | 8.0 | ----do---- | 0 | Good | Negative | Positive. |
| 6.0 | 6.0 | Sodium stearate | 0.0002 | None obtained | | |
| 6.0 | 7.0 | ----do---- | 0.0002 | Fair | Negative | Positive. |
| 6.0 | 6.0 | Sodium oleate | 0.0002 | None obtained | | |
| 6.0 | 7.0 | ----do---- | 0.0002 | Fair | Negative | Positive. |
| 6.0 | 6.0 | Castile soap | 0.0002 | None obtained | | |
| 6.0 | 7.0 | ----do---- | 0.0002 | Good | Negative | Positive. |
| 6.0 | 6.0 | Sodium resinate | 0.0002 | None obtained | | |
| 6.0 | 7.0 | ----do---- | 0.0002 | Fair | Negative | Positive. |
| 6.0 | 6.0 | Ammonium tripropyl naphthalene sulfonate. | 0.00005 | Good | ----do---- | Negative. |
| 6.0 | 6.0 | Sodium retene sulfonate | 0.00005 | ----do---- | Negative | Do. |
| 6.0 | 6.0 | Ammonium petroleum sulfonate (green acid type). | 0.00005 | ----do---- | Negative | Do. |

Examination of the above table emphasizes the numerous salinet points previously discussed. For instance, reference is made to those tests in the above table which are concerned with the use of the common, rather simple, type of break inducer, to wit, materials such as sodium stearate, sodium oleate, castile soap, sodium resinate and the like.

Furthermore attention is directed to the first three tests which indicate the results obtained when sulfur alone is used as the break inducer. It is to be noted that in the tests as conducted, it was necessary to use six milligrams of sulfur in order to complete the chemical reactions. On the other hand, the addition of 17% excess of sulfur, i. e., the use of 7 milligrams of elementary sulfur, did not give a break. However, when the amount of sulfur used was increased to 8 milligrams, i. e. a 33⅓% excess, then a perfectly satisfactory break was obtained. Obviously such excess of elementary sulfur resulted in a positive butyl mercaptan test. When an effort was made to substitute the common soap type of break inducer for elementary sulfur, it was found that their use, in amount equivalent to 10 times the amount of sulfur required for break induction, did not give satisfactory results. For instance, when the 2 milligram excess of elementary sulfur was replaced by 20 milligrams of sodium stearate, the break obtained was only fair. This same condition prevailed when a similar amount of sodium oleate or sodium resinate was employed. Only in the case of castile soap were results obtained which could be characterized as good; i. e., sufficiently satisfactory to indicate they would be satisfactory under practically all plant conditions. However, when the amount of sulfur used was only theoretical, that is only six milligrams, and when an effort was made to rely upon the simple break inducers solely for break induction, then it is to be noted that absolutely no break was obtained. In other words, if one adds only the amount of elementary sulfur required to complete the chemical reaction and attempts to depend on the addition of sodium stearate, sodium oleate, castile soap or sodium resinate, as sole break inducers, satisfactory results were not only unobtainable but a satisfactory break was not obtained even when these compounds were employed in a ratio of 1 to 5000.

break induction, or to say it in another way, when the amount of sulfur employed was only sufficient to complete the chemical reactions involved. In each instance, since there was no excess sulfur employed, the butyl mercaptan test obviously has to be negative. Since the butyl mercaptan test had to be negative, it followed that the gasoline was of a type which was free from certain inherently objectionable qualities which are common when there is an excess of elementary sulfur present, or when the gasoline gives a positive butyl mercaptan test. In each instance, the break obtained was the kind characterized as being "good", i. e. appeared to be satisfactory under any condition of plant operation which one would ordinarily employ.

We have previously indicated that the amount of added break inducer may be as low as one part in 75,000 parts of the oil being sweetened. In practice, however, the amount of break inducer actually present in the oil may be even less than this during certain phases of the process. For example, in an operation involving recirculation of doctor solution, the ratio of break inducer in the first batch of oil may not exceed one to 30,000 or even one to 45,000 but recycling of the doctor solution once or twice, without further addition of break inducer, may result in an actual ratio of 1-80,000 or 1-90,000 or even a ratio in excess of 1-100,000 in subsequent batches of oil. Therefore, it is to be understood that the heretofore mentioned ratio of 1-75,000 is not the upper limit of effectiveness, particularly in a recirculation process.

It will be further understood that, instead of employing a single break inducer of the kind herein disclosed, a mixture of two or more of them may be used, if desired. Indeed, the process of manufacture may result in the production of a mixture of a number of break-inducing compounds rather than a single compound in a technically or chemically pure state. Moreover, a break inducer of this invention may be employed in admixture with other types of break inducers for which we have filed separate applications.

Frequently, the compounds of this invention have beneficial effects in addition to bringing about rapid subsidence. For example, as a result of their use, the amount of "black strap" or feathery material appearing at interfacial surfaces may be greatly diminished or entirely eliminated.

The compounds herein disclosed as break inducers have molecular weights of at least 214 and not above 1000. As representative of compounds whose molecular weight approximates the upper limit of 1000 may be mentioned the higher alkylated derivatives of such compounds as dinaphthyl methane in which there has been introduced two or three cetyl radicals and two or more sulfonic groups.

It is to be understood that the detailed disclosures herein are for illustrative purposes only and are not to be considered as limitations on the invention, inasmuch as various modifications within the scope of the appended claims will be apparent to those skilled in the art.

Having described our invention, we claim:

1. A method for sweetening hydrocarbon oils containing mercaptans which comprises treating the oil with doctor solution, sufficient elementary sulfur to convert the mercaptans into innocuous compounds, and a break inducing agent comprising a water-soluble salt of a sulfonic acid containing a hydrocarbon radical and having a molecular weight between 214 and 1000 and whose alkali metal salts are surface-active.

2. In the sweetening of sour hydrocarbon oils by treatment with doctor solution and elementary sulfur, the method which comprises incorporating into the oil a relatively small amount of a break-inducing water-soluble salt of a sulfonic acid containing a hydrocarbon radical and having a molecular weight between 214 and 1000 and whose alkali metal salts are surface-active.

3. A method for sweetening hydrocarbon oils containing mercaptans which comprises treating the oil with doctor solution, elementary sulfur in quantity not appreciably in excess of the theoretical amount required to convert the mercaptans into innocuous compounds, and a break inducing agent comprising a water-soluble salt of a sulfonic acid containing a hydrocarbon radical and having a molecular weight between 214 and 1000 and whose alkali metal salts are surface-active.

4. A method for sweetening hydrocarbon oils containing mercaptans which comprises converting the mercaptans into innocuous compounds by treatment of the oil with alkaline plumbite solution and elementary sulfur, the amount of sulfur being insufficient to render the oil positive to the butyl mercaptan test and insufficient to effect settling or subsidence, and adding a break inducing agent comprising a water-soluble salt of a sulfonic acid containing a hydrocarbon radical and having a molecular weight between 214 and 1000 and whose alkali metal salts are surface-active.

5. In the sweetening of sour hydrocarbon oils by treatment with doctor solution and elementary sulfur, the method which comprises incorporating into the oil, in a ratio between about 1 to 5000 and 1 to 75,000, a break-inducing water-soluble salt of a sulfonic acid containing a hydrocarbon radical and having a molecular weight between 214 and 1000 and whose alkali metal salts are surface-active.

6. In the sweetening of sour hydrocarbon oils by treatment with doctor solution and elementary sulfur, the improvement which comprises facilitating the break in the doctor treatment by the addition of a water-soluble salt of a sulfonic acid containing a hydrocarbon radical and having a molecular weight between 214 and 1000 and whose alkali metal salts are surface-active.

7. In the sweetening of sour hydrocarbon oils by treatment with doctor solution and elementary sulfur, the improvement which comprises facilitating the break in the doctor treatment by the addition of a water-soluble salt of a petroleum sulfonic acid.

8. In the sweetening of sour hydrocarbon oils by treatment with doctor solution and elementary sulfur, the improvement which comprises facilitating the break in the doctor treatment by the addition of a water-soluble salt of a green acid of petroleum.

9. In the sweetening of sour hydrocarbon oils by treatment with doctor solution and elementary sulfur, the improvement which comprises facilitating the break in the doctor treatment by the addition of a water-soluble salt of an alkylated aromatic sulfonic acid.

10. In the sweetening of sour hydrocarbon oils by treatment with doctor solution and elementary sulfur, the improvement which comprises facilitating the break in the doctor treatment by the addition of a water-soluble salt of an alicyclic sulfonic acid containing at least one alkyl side chain.

11. In the sweetening of sour hydrocarbon oils by treatment with doctor solution and elementary sulfur, the improvement which comprises facilitating the break in the doctor treatment by the addition of a water-soluble salt of an alkylated bicyclic aromatic sulfonic acid.

12. In the sweetening of sour hydrocarbon oils by treatment with doctor solution and elementary sulfur, the improvement which comprises facilitating the break in the doctor treatment by the addition of a water-soluble alkylated naphthalene sulfonate.

13. In the sweetening of sour hydrocarbon oils by treatment with doctor solution and elementary sulfur, the improvement which comprises facilitating the break in the doctor treatment by the addition of a water-soluble retene sulfonate.

14. In the sweetening of sour hydrocarbon oils by treatment with doctor solution and elementary sulfur, the improvement which comprises facilitating the break in the doctor treatment by the addition of a water-soluble tripropyl naphthalene sulfonate.

CHARLES M. BLAIR, Jr.
IRA S. BOYDSTUN.